3,098,798
PREPARATION OF PURIFIED METHACROLEIN
Barnard Mitchel Marks, Wilmington, Del., assignor to E. I. du Pont de Nemours and Company, Wilmington, Del., a corporation of Delaware
Filed Mar. 18, 1960, Ser. No. 15,827
3 Claims. (Cl. 202—42)

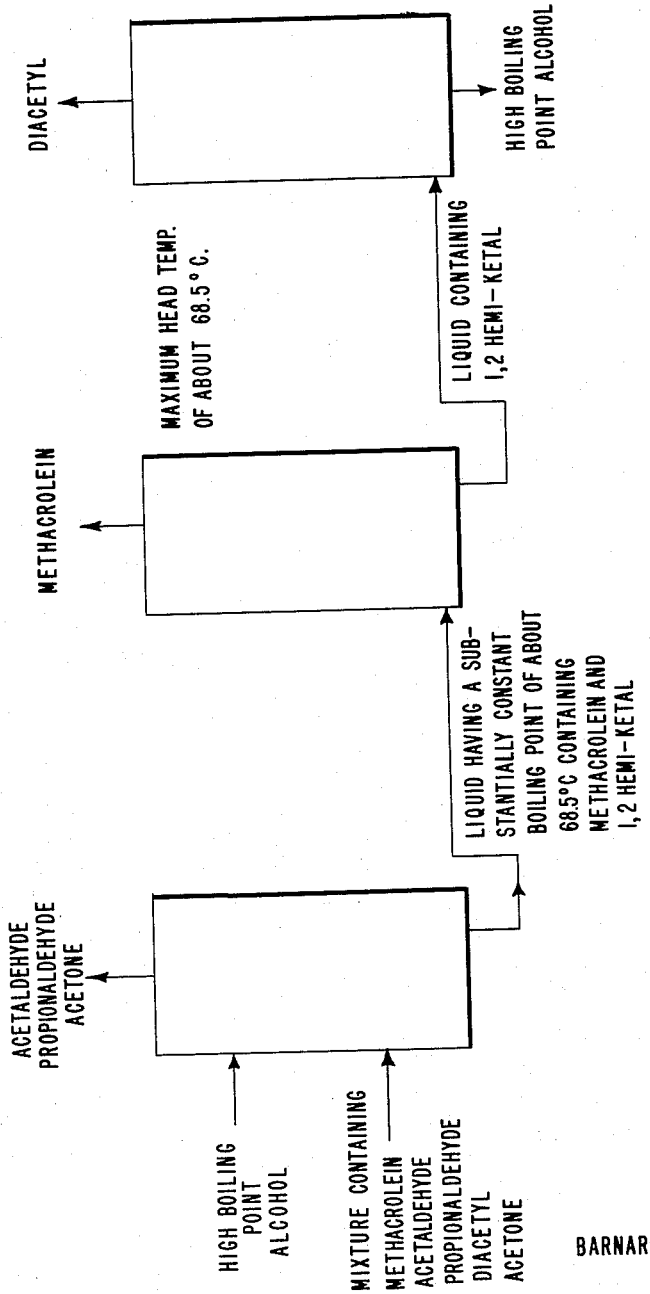

This invention relates to the purification of methacrolein and more particularly to the purification of crude methacrolein for use as a polymer intermediate.

The unsaturated aldehyde, methacrolein, is used for the preparation of homopolymers and has been copolymerized with other unsaturated polymerizable organic compounds to give cross-linked products. A prerequisite to acceptable commercial polymers, it has been found, is the preparation of substantially pure colorless monomers. Many attempts have been made to prepare methacrolein in a pure state. This unsaturated aldehyde, however, is unstable and reacts with products of its own decomposition as well as with impurities which are normally present in the commercially available product. The autoproduction of a variety of contaminating substances has been one of the principal difficulties encountered when purification was attempted by known distillation procedures.

Methacrolein monomer, available on the open market, contains, in addition to acetaldehyde, propionaldehyde and acetone, as low boiling impurities, a yellow substance believed to be diacetyl, together with varying amounts of methacrolein dimer and other unknown high boilers. No satisfactory process is known that effects removal of such impurities, while at the same time avoiding reactions, homopolymerizations and copolymerizations of the highly reactive unsaturated aldehyde.

Objects of the present invention are to provide: improved processes for the purification of methacrolein; a process for preparing high quality, substantially pure, colorless methacrolein; a process for removing impurities as thermally unstable complexes from the crude commercial aldehyde; a process for purifying crude methacrolein by distillation from said complexes; a reaction-distillation process for the separation of impurities present in crude methacrolein and thereby to provide a pure colorless monomer for polymerization to a highly acceptable homopolymer and copolymer. Other objects and advantages of the invention will hereinafter appear.

The above and other objects are accomplished, in accord with the invention, by forming a thermally unstable complex between the impurities present in crude commercial methacrolein and an alcohol, and thereafter subjecting the resulting solution to distillation. During the distillation the low boiling impurities and the thermally unstable complex are separated from the methacrolein, which is thereby purified, and the complex treated for recovery and reuse of the alcohol.

The process of this invention may be readily understood by reference to the appended drawing which is a diagrammatic illustration of apparatus and process flow suitable for the practice of the invention.

In one embodiment of the invention a high boiling alcohol, such as n-amyl alcohol, is added to a methacrolein, for example, a better than 80% methacrolein containing water, acetaldehyde, propionaldehyde, acetone and high boiling contaminants and the resulting solution heated in a still fitted with a reflux condenser to form a complex between the alcohol and the high boiling contaminants.

Heating is continued under a high reflux ratio (~10 to 1) until all low-boiling impurities are removed, i.e., compounds and/or azeotropic mixtures boiling at atmospheric pressure below that of pure methacrolein (B.P. 68.5° C.). This point is reached when a substantially constant boiling point, under high reflux ratio, is attained and is essentially the boiling point of pure methacrolein (~68.5° C.) at atmospheric pressure.

The distillation of pure methacrolein monomer is continued at a more rapid rate using a lower reflux ratio (~2 to 1). As the purified methacrolein monomer distills off, the pot temperature rises with decreasing concentration of the lower boiling methacrolein until mostly higher boiling components remain including the thermally unstable colored complex with n-amyl alcohol left in the still pot.

The n-amyl alcohol can be recovered from the complex by continuing the distillation. As soon as the pot temperature increases above a critical point, the complex dissociates and the colored component, together with final traces of methacrolein and minor amounts of the alcohol, volatilizes. This is continued until all traces of the colored impurities are distilled over. The still head temperature rises to the boiling point of pure n-amyl alcohol, and then n-amyl alcohol can be distilled over and recovered for further use.

The distillation may be conducted as a continuous process or as a batch process, the essential difference in operation being that in the former case a series of columns are, for example, used to effect the separation of the unsaturated aldehyde, alcohol and contaminants. The low boiling impurities are distilled overhead in one column, the purified methacrolein being distilled overhead in an intermediate column, and the thermally unstable complex discharged with the alcohol as the tails to another column. The alcohol-high boiling contaminant complex in the latter column is decomposed and the alcohol recovered and returned to the first distillation step.

The following examples are illustrative of embodiments of the invention. Parts and percentages are by weight unless otherwise noted.

*Example I*

A solution containing 800 ml. of methacrolein (containing 0.1% hydroquinone) and 100 ml. of n-amyl alcohol is subjected to distillation in a 1″ x 5′ Vigreux column. The initial distillation is carried out using a high reflux ratio, about 10:1, and a pot temperature of about 70° C., until all of the low boiling impurities are eliminated. This procedure gives a minimum loss of monomer. The effectiveness of the preliminary separation of the low boilers can be demonstrated either by continuing the distillation under total reflux for 15–20 minutes and noting whether there is a decrease of not more than 0.02° C. in the head temperature or by removing a portion of the charge and determining the purity otherwise. If the decrease is no greater than 0.02° C., there is a good indication that the monomer is practically free of low boilers including the methacrolein-water azeotrope (B.P. 62.5° C.). Thereafter the methacrolein is distilled over (collected in a receiver containing as an antioxidant, 1% of 2,6-di-t-butyl-4-methyl phenol) and is found to be exceptionally free from impurities. This product is better than 99.99% methacrolein monomer having a boiling point of 68.5° C. The residue left in the still pot is then heated at a temperature of about 125° C. to decompose the complex, the non-alcohol portion of the complex is distilled over and the n-amyl alcohol left in the pot recovered for reuse.

The recovery of the pure, colorless methacrolein is dependent on the separation of the low boilers and a yellow colored impurity of undetermined composition which is complexed in the process with the n-amyl alcohol by what is apparently a 1,2-hemi-ketal having a low vapor pressure. At temperatures of about 120° C., the 1,2-hemi-ketal starts to decompose under normal pressure and the yellow colored impurity will begin to appear in the condensate when the pot temperature appreciably exceeds this value. The yellow impurities will distill overhead at head temperatures between 70–135° C. Most of the n-amyl alcohol is left in the still pot.

Example II

A crude methacrolein containing 3% excess water is refrigerated to a temperature of about −80° C. for about two hours. The crystalline hydrate formed freezes out at this temperature and is separated. About 100 parts by volume of cyclohexanol is added to about 700 parts of the substantially water-free product and the mixture placed in a still pot under a 1″ x 5′ Vigreux column. The initial distillation is conducted at a high reflux ratio to eliminate all the low boiling impurities, pot temperature being about 72–74° C. A part of the still charge is tested under total reflux for about 15 minutes, a still head temperature drop of not more than 0.02° C. indicates that the low boilers have been removed. Substantially pure, colorless methacrolein is then distilled over with a maximum head temperature of 68.5° C. The residue in the still pot may be treated to decompose the complex formed and the cyclohexanol recovered.

Any alcohol that boils substantially above 75° C. and preferably above 130° C. can be used in the process of this invention. These alcohols generally form thermally unstable complexes (which appear to be mainly 1,2-diketal or a hemi-ketal) of low vapor pressure, with the yellow colored contaminants of the methacrolein, which complex boils above the boiling point of this aldehyde. Examples of suitable alcohols include the monohydric alcohols such as n-amyl, hexyl, heptyl, octyl, and higher molecular weight monohydric alcohols that boil preferably above 75° C.; the cyclic alcohols such as cyclohexanol; the polyhydric alcohols and their mono-alkyl ethers, such as ethylene and propylene glycols and their hydroxy ethers. The alcohol should be added to the methacrolein in sufficient amounts to form the thermally unstable complex with the contaminants present—usually 10 to 20% by weight of the alcohol per weight of feed material is ample for this purpose, although larger amounts appear to have little or no adverse influence on the separation.

The first phase of the distillation is conducted with a high reflux ratio, up to 10:1 (reflux to distillate) or more, already referred to, to eliminate the low boiling impurities on the one hand and to effect the formation of the thermally unstable hemi-ketal on the other. Whenever the crude monomer contains any considerable amount of water it may be frozen out at a low temperature, preferably −80° C. or at a lower temperature, and separated through a filter stick or by any other suitable means. As the distillation at high reflux ratio reaches a fairly constant still head temperature, the still is placed under total reflux for 10 to 20 minutes. I during total refluxing the drop in still head temperature i not more than 0.02° C., the monomer is sufficiently fre from low-boiling contaminants, and when separated by distillation from the complex formed will be found to be substantially colorless and have a boiling point in the vicinity of about 68.5° C. Further purification can be accomplished by a second distillation (without the addition of the alcohol) and collection of the purified monomer in receivers at a temperature of about 0° C., protected from actinic activation, by deep red colored cellophane, or by other suitable light filter.

The methacrolein produced by the processes of the invention is well suited for use in polymerization reactions for the production of colorless polymers and copolymers and for other uses in which the highly purified, unsaturated aldehyde is required.

I claim:
1. A process for the production of purified methacrolein from a mixture containing methacrolein, acetaldehyde, propionaldehyde, acetone, and diacetyl which comprises:
   (a) adding an alcohol having a boiling point above 75° C. to said mixture,
   (b) heating said mixture containing said alcohol, under high reflux conditions, in a first stage, until a substantially constant boiling point of about 68.5° C. is attained, while distilling off said acetaldehyde, propionaldehyde and acetone, and while forming a thermally-unstable-high-boiling 1,2-hemi-ketal from said alcohol and said diacetyl,
   (c) heating, in a second stage, under reflux at a maximum head temperature of about 68.5° C., the reflux of said first stage to distill off said methacrolein in purified form,
   (d) heating, in a third stage, the reflux of said second stage to break up said thermally-unstable-high-boiling 1,2-hemi-ketal and
   (e) recovering said alcohol.
2. The process of claim 1 in which the alcohol is a monohydric aliphatic alcohol, and in which the amount of alcohol added is from 10 to 20% by weight of said mixture.
3. The process of claim 2 in which the alcohol used is n-amyl alcohol.

References Cited in the file of this patent
UNITED STATES PATENTS

| | | |
|---|---|---|
| 2,514,966 | Pierotti et al. | July 11, 1950 |
| 2,514,967 | Pierotti | July 11, 1950 |
| 2,757,131 | Howlett et al. | July 31, 1956 |
| 2,791,550 | West et al. | May 7, 1957 |
| 2,906,676 | Bewley et al. | Sept. 29, 1959 |